Jan. 12, 1926.  1,569,245

A. V. D. WILLGOOS

INTERNAL COMBUSTION ENGINE

Filed April 17, 1925

INVENTOR.
ANDREW V. D. WILLGOOS.
BY
*Stockbridge & Borst*
ATTORNEYS.

Patented Jan. 12, 1926.

1,569,245

UNITED STATES PATENT OFFICE.

ANDREW V. D. WILLGOOS, OF UPPER MONTCLAIR, NEW JERSEY, ASSIGNOR TO WRIGHT AERONAUTICAL CORPORATION, A CORPORATION OF NEW YORK.

INTERNAL-COMBUSTION ENGINE.

Application filed April 17, 1925. Serial No. 23,858.

*To all whom it may concern:*

Be it known that I, ANDREW V. D. WILL-GOOS, a citizen of the United States, residing at Upper Montclair, in the county of Essex and State of New Jersey, have invented certain new and useful Improvements in Internal-Combustion Engines, of which the following is a full, clear, and exact description.

This invention relates to the anchorage of valve seats within the valve passages of internal combustion engines. In connection with poppet valves of internal combustion engines, it is frequently desirable to make the valve seat of a material different from the material of which the cylinder head is made. Valve seats of this type are frequently used in internal combustion engines designed for employment in aircraft, but the invention is applicable to any poppet valve construction employing a valve seat separate from the cylinder head.

Heretofore it has been a frequent practice to shrink the valve seat into the valve passage in the cylinder head, but this method has been unsatisfactory for the reason that frequently when excessive temperatures were encountered, the valve seat dropped out of place. Furthermore, the diameter of the recess in the valve passage of the cylinder head and the outside diameter of the valve seat must be held to exceedingly close limits, so that very careful and expensive machining operations are necessary.

An object of this invention is to provide an improved method of inserting valve seats in internal combustion engines and the like; which will not require as accurate machining as heretofore; and which may be easily, rapidly and inexpensively carried out.

A further object is to provide an improved cylinder head construction for internal combustion engines, in which the valve seat will be securely and tightly anchored against displacement under all operating conditions, regardless of the temperatures encountered; with which the seat will not become loose or be displaced in use; with which careful and accurate machining operations will be unnecessary; and which will be durable and relatively inexpensive.

Various other objects and advantages will be apparent from the following description of one embodiment of the invention, and the novel features will be particularly pointed out hereinafter in connection with the appended claim.

In the accompanying drawing:—

Figure 1:
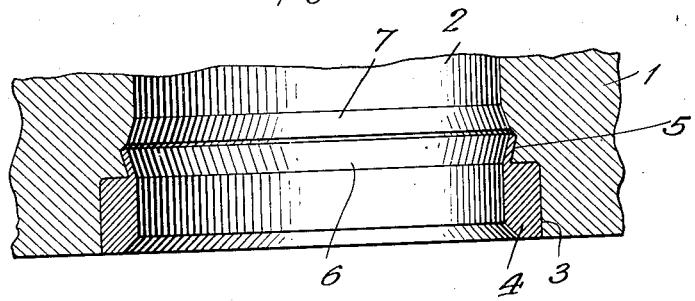
Fig. 1 is a section through a portion of a cylinder head at one of the valve passages, and illustrating a valve seat anchored in the cylinder head in accordance with this invention.

In the illustrated embodiment of the invention, the cylinder head 1 is provided with the usual valve passage 2 leading to the combustion chamber. At the inner end of the passage 2, the cylinder head is provided with a recess 3 of a size and shape to receive the valve seat 4 as heretofore. The wall of the valve passage 2 is provided at a point adjacent the recess 3 with a groove 5. The valve seat 4 is provided at its inner end with a flange or retaining lip 6 which normally overlies the groove 5 when the seat is inserted into the recess 3.

Figure 3:
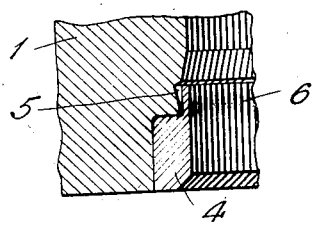
Fig. 3 is a partial sectional elevation of the same after the ring is inserted, but before it is anchored therein.

After the valve seat is in position, as shown in Figs. 1 and 3, the flange or retaining lip 6 is expanded into the groove 5 as shown in Fig. 1, and the engagement of this lip or flange 6 in the groove will securely and tightly anchor the seat within the recess 3. The wall of the groove 5 extending toward the recess 3 is preferably inclined to the axis of the passage, so that when the flange or lip 6 is expanded therein and against this inclined wall, the act of expanding the flange or lip will automatically draw the seat 4 tightly into the recess 3 and against the inner end wall of the recess. The seat 4 will thus be securely anchored, and can never be displaced from this position.

While the valve seat may be merely set into the recess in the valve passage and anchored tightly therein by the expansion of the lip or flange 6 into the groove, I preferably shrink the seat 4 into its recess as heretofore, in order to secure the best possible heat conductivity between the valve seat and the cylinder head, and thus avoid undue heating of the valve seat. After the valve seat is shrunk into the recess 3, its lip or flange 6 will be expanded by suitable expanding tools, such as are employed, for example, in expanding boiler tubes into tube sheets.

The valve passage 2 is preferably beveled or chamfered as at 7 to provide a smooth surface leading to the inner end of the lip or flange 6, in order that sharp ledges in the valve passage may be avoided.

In aircraft engines, the cylinder heads are commonly made of aluminum, and in such cases valve seats of aluminum bronze have been found to be particularly useful. Aluminum bronze is sufficiently ductile to be expanded in the manner described in anchoring seats to the cylinder head.

Figure 2:
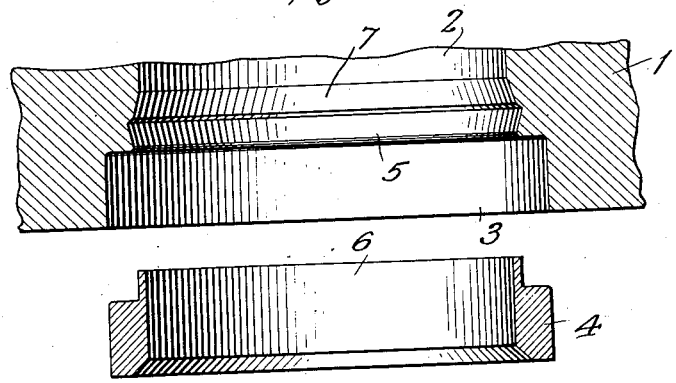
Fig. 2 is a sectional elevation of the same just before the ring is inserted.

In accordance with this invention, the valve passage 2 is formed in the shape shown in Fig. 2, and the valve seat 4, usually in the form of a ring is formed as shown also in Fig. 2, with the flange or lip 6, forming a cylindrical extension of the seat. The cylinder head is then heated to the desired temperature, and the valve seat may also be cooled, after which the seat is inserted into the recess 3 in the manner shown in Fig. 3, and the cylinder head allowed to cool. As the head cools, it will contract around and tightly engage the seat and normally anchor it in position. Thereupon the flange or lip 6 may be expanded into the groove 5 where it will serve to firmly anchor the seat in the recess 3 as shown in Fig. 1.

It has been found that when the valve seats are anchored in the cylinder heads by this method, they never become loose or displaced, and the cost is relatively low because less accuracy in fitting the seats to the recesses 3 is necessary.

It will be obvious that various changes in the details and materials, which have been herein described and illustrated for the purpose of explaining the nature of the invention, may be made by those skilled in the art within the principle and scope of the invention, as expressed in the appended claim.

I claim:

In an internal combustion engine, a cylinder head having a valve passage with an annular recess therein, a valve seat set into said recess, the wall of the passage having a groove adjacent the seat, said seat having a flange expanded into said groove, and said passage having a chamfered portion leading to said groove to avoid sharp shoulders in the passage caused by the flange.

In witness whereof, I hereunto subscribe my signature.

ANDREW V. D. WILLGOOS.